L. LOTZ.
Combined Scoop and Sieve.
No. 219,167. Patented Sept. 2, 1879.
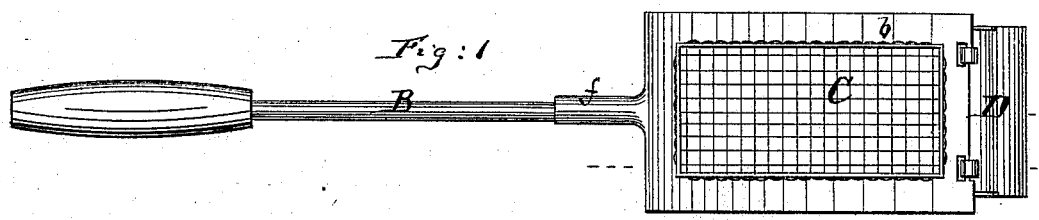
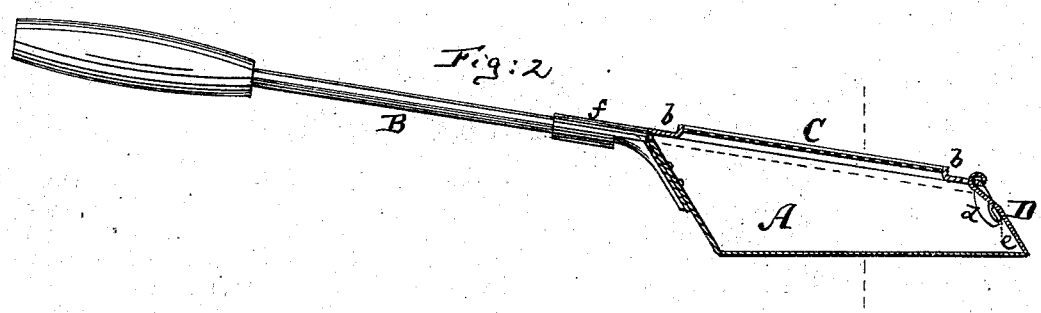
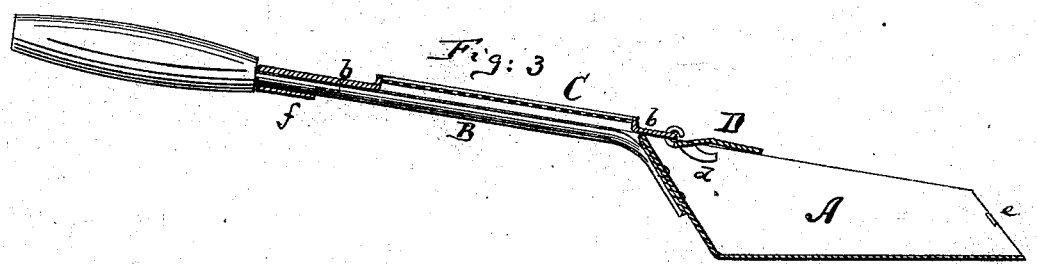
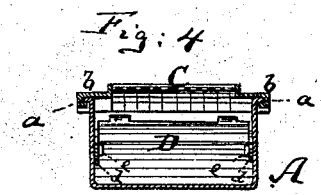
Witnesses:
John C. Tunbridge.
Wm. H. C. Smith.
Inventor:
Lorenz Lotz
by his attorney
A. v. Briesen

UNITED STATES PATENT OFFICE.

LORENZ LOTZ, OF BROOKLYN, NEW YORK.

IMPROVEMENT IN COMBINED SCOOP AND SIEVE.

Specification forming part of Letters Patent No. 219,167, dated September 2, 1879; application filed July 25, 1879.

*To all whom it may concern:*

Be it known that I, LORENZ LOTZ, of Brooklyn, county of Kings, and State of New York, have invented an Improved Combined Shovel or Scoop and Sieve, of which the following is a specification.

Figure 1 is a top view of my combined scoop or shovel and sieve; Fig. 2, a longitudinal section of the same, showing the sieve closed; and Fig. 3, a longitudinal section of the same, showing the sieve open; Fig. 4, a transverse section of the same.

Similar letters of reference indicate corresponding parts in all the figures.

This invention relates to an improved instrument for housekeeping purposes, to be used either for cleaning coal, sifting flour, or the like; and consists in applying to a scoop or shovel which is capable of the ordinary uses to which such instruments are put a sliding sieve carrying a hinged lid, which, when the sieve is moved over the scoop or shovel, will cause the contents thereof to be entirely inclosed, so that the sieve part may be used in the ordinary manner to separate the coarser from the finer particles of the contents.

In the accompanying drawings, the letter A represents a suitable scoop or shovel, having a handle, B. The sides of the scoop or shovel are preferably provided with outwardly-projecting ledges $a$, as indicated in Fig. 4, which constitute rails for the support of the sliding frame $b$ of the sieve C, as also shown in Fig. 4, so that the sieve may be free to slide on said rails, either to close the scoop, as in Figs. 1 and 2, or to open it, as in Fig. 3.

To the forward end of the frame of the sieve is hinged, in suitable manner, a plate or lid, D, which on its under or inner side has one or more suitable hooks, $d$, that are intended to catch behind inwardly-projecting lugs $e$, which are formed on the forward end of the scoop or shovel, as indicated in Fig. 3.

When the shovel is to be used as such, the sieve is drawn back over the handle, as indicated in Fig. 3, and has for this purpose a ferrule or loop, $f$, formed on it, which slides on the handle, and finds its support on the same. In drawing back the sieve the lid D is drawn back with it, resting on the back part of the scoop, as shown in Fig. 3.

If the contents of the shovel are to be sifted, the sieve is moved over the shovel or scoop, as in Fig. 2, the lid D being held over the end of the scoop or shovel by means of the hooks $d$ and lugs $e$, or in other equivalent manner. Thus the scoop or shovel is inclosed, and can now be reversed and used as a sieve in the manner in which sieves are usually employed. By merely pulling the sieve back along the handle the lid will be withdrawn from over the front end of the scoop, and the latter thus opened, to be again used in the manner in which such scoops or shovels are usually used.

For separating ashes from cinders and coal, for sifting flour, sugar, and the like, this invention will be found advantageous.

I claim—

1. The scoop or shovel A, made with the rails or guides $a$, and combined with the sliding sieve C, which is arranged to be slid backward over the scoop-handle B, when the scoop is to be used alone, substantially as herein shown and described.

2. The combination of the scoop A, having a fixed bottom, with the sliding sieve C and folding lid D, and with the holding devices $d$ $e$, substantially as herein shown and described.

3. The sliding sieve C, made with the loop or ferrule $f$, and applied over a scoop or shovel, and made movable thereon, substantially as herein shown and described.

LORENZ LOTZ.

Witnesses:
T. B. MOSHER,
A. V. BRIESEN.